July 22, 1969 R. J. DOSS 3,457,513

MULTI-PURPOSE RECEIVER WITH SINGLE DETECTOR FOR DEMODULATING A PLURALITY OF TYPES OF SIGNALS

Filed Oct. 11, 1965 2 Sheets-Sheet 1

FIG. I

INVENTOR.
ROBERT J. DOSS

BY

Darby & Darby

ATTORNEYS

INVENTOR.
ROBERT J. DOSS
BY Darby & Darby
ATTORNEYS

United States Patent Office 3,457,513

Patented July 22, 1969

3,457,513

MULTI-PURPOSE RECEIVER WITH SINGLE DETECTOR FOR DEMODULATING A PLURALITY OF TYPES OF SIGNALS

Robert J. Doss, Cincinnati, Ohio, assignor to Avco Corporation, Cincinnati, Ohio, a corporation of Delaware Filed Oct. 11, 1965, Ser. No. 494,830
Int. Cl. H04b *1/26*
U.S. Cl. 325—317 5 Claims

ABSTRACT OF THE DISCLOSURE

A multi-purpose receiver having first and second amplifiers in which the first amplifier receives an intelligence signal to be demodulated. A local oscillator is selectively switched to apply its signals to the second amplifier and a biasing circuit is provided to render both the second amplifier and a diode located between the local oscillator and the second amplifier non-conductive or conductive to block or pass the local oscillator signal to the second amplifier. A detector is connected to the outputs of the first and second amplifiers where the local oscillator signal and the intelligence signal are mixed and demodulated.

Figure 1:
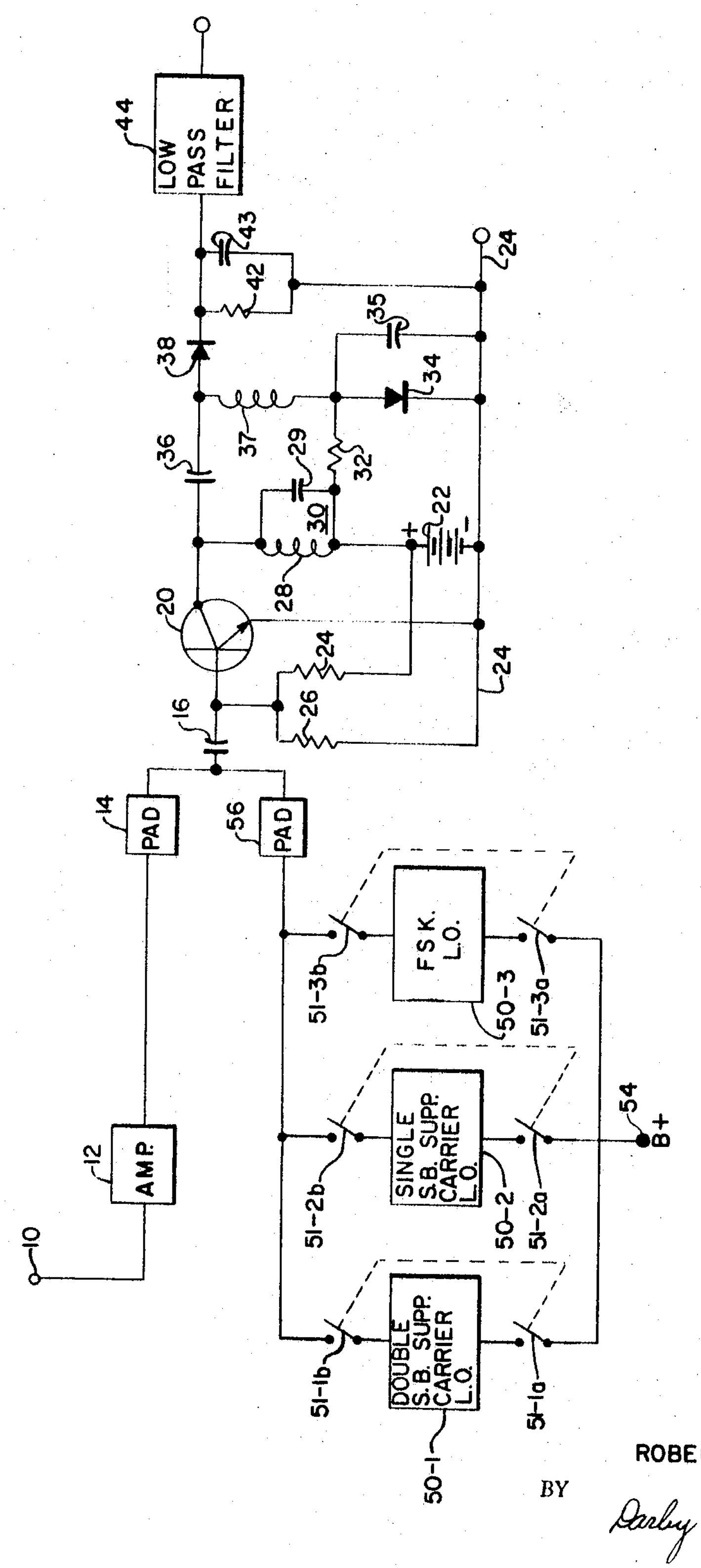

This invention relates to circuits for detecting intelligence in communication systems and to multipurpose detector circuits capable of demodulating intelligence produced by a variety of modulation techniques.

In general purpose communications receivers for receiving a plurality of signals having different types of modulation, a problem arises with respect to the demodulation of the intelligence from such signals. It is of course possible to provide a separate detector, or demodulator, circuit for each type of signal and to switch the various circuits into operation either manually or automatically when a particular type of modulation is to be detected. Such an arrangement requires a considerable number of components which makes the multipurpose receiver more expensive, more complex and have greater bulk. All of these disadvantages are of course desirably avoided.

The present invention relates to a detector circuit for use with multipurpose receivers of the type for receiving signals on which intelligence is modulated by amplitude modulating (AM) techniques or techniques which permit the intelligence to be detected by an amplitude modulation detector. Typical of such modulated signals are conventional amplitude modulated carrier waves, single and double side band suppressed carrier amplitude modulated waves, frequency shift keyed (FSK) signals, keyed continuous wave, and continuous wave signals.

In accordance with the invention, a single detector for demodulating amplitude modulated types of intelligence is provided for a multipurpose communications receiver.

This detector is capable of directly demodulating information from an amplitude modulated carrier wave signal applied to it. The circuit also includes a separate local oscillator for producing an auxiliary local oscillator signal of the proper frequency for mixing with one or more of the other types of signals which are received to form a resultant signal having amplitude modulated characteristics from which the intelligence can be demodulated by the same detector.

In one embodiment of the invention each local oscillator is rendered effective and ineffective by switching its power supply on and off, respectively. Therefore, a respective local oscillator signal is not applied to the detector circuit until the oscillator is actually switched on. In another embodiment an arrangement is provided by which the setting of a power supply switch for the detector circuit blocks or opens an amplifier circuit through which the auxiliary local oscillator signal is injected to be mixed with the received signal.

It is therefore an object of the present invention to provide a multi-purpose detector circuit for a communications receiver.

A further object is to provide a detector circuit capable of demodulating intelligence from a received radio frequency signal on which it is modulated in a form capable of detection by an amplitude modulated detector circuit.

An additional object is to provide an amplitude modulation detector circuit into which auxiliary local oscillator signals are selectively injected for mixing with a received radio frequency signal so that a single detector can demodulate intelligence carried by said signals and placed thereon by a variety of modulation techniques.

Figure 2:
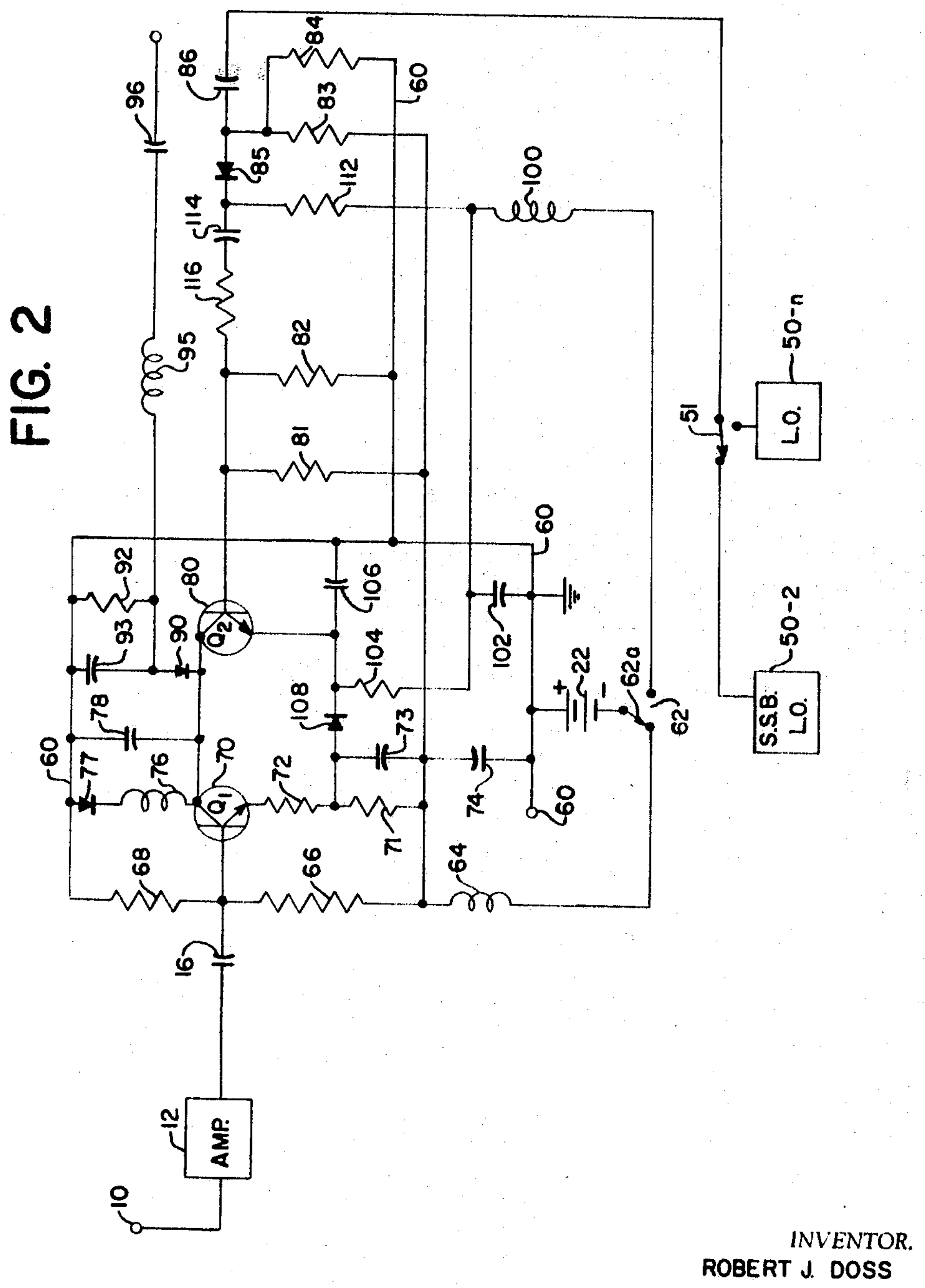

Other objects and advantages of the present invention will become more apparent upon reference to the following specification and annexed drawings in which:

FIGURE 1 is a schematic diagram of a circuit illustrating the operating principles of the invention; and FIGURE 2 is a schematic diagram of another embodiment of the invention.

Referring first to the circuit of FIGURE 1 and considering its operation with respect to the reception of a conventional double sideband amplitude modulated (AM) carrier wave signal, this signal is received at an input terminal 10. Preceding terminal 10 may be any of a number of conventional circuits such as an antenna, radio frequency amplifier, and so forth. These are not shown since they are irrelevant to the present invention. The AM signal is amplified by any suitable conventional amplifier 12 having frequency responsive circuits such that it is capable of operating over a relatively wide frequency band. The output of amplifier 12, which is still the amplitude modulated carrier wave, is applied to an isolation pad 14 of any suitable conventional construction such as a lumped constant filter made from passive circuit components or an active element such as a buffer amplifier. The pad 14 is a one way transmission device in which signals applied at its input pass to its output while signals at its output cannot pass back to the input.

The amplitude modulated carrier wave at the output of pad 14 is applied through a coupling capacitor 16 to the base of an NPN transistor 20. Biasing voltages are supplied to transistor 20 from a battery 22, or any other suitable direct current (DC) power supply. As shown, battery 22 has its negative terminal connected to a common reference potential line 24 to which the emitter electrode of transistor 20 is connected. Therefore, transistor 20 operates in a common emitter configuration. Bias voltage is supplied to the base of transistor 20 from the positive terminal of the battery 22 through a voltage divider formed by series connected resistors 24 and 26 whose junction point is connected to the base of the transistor. Forward bias is applied to the collector from the positive terminal of battery 22 through a coil 28. A capacitor 29 is connected across coil 28 to form a parallel tuned resonant (tank) circuit.

Resonant circuit 30 is the collector load for transistor 20 and it is tuned so that transistor 20 has good gain characteristics with respect to the frequency of the carrier wave signal being received and/or the frequency of other injected local oscillator signals.

A series connected resistor 32 and diode 34 are connected between the lower end of coil 28 and the common line to form a conventional temperature stabilization circuit for transistor 20. RF energy is bypassed around diode 34 by a shunt capacitor 35. As the ambient operating temperature of the circuit increases, resulting in an increase in collector current, the resistance of diode 34 also changes to reduce the forward bias on the transistor thereby decreasing the collector current. This prevents thermal runaway of transistor 20.

The output of amplifier 20, which is still the composite amplitude modulated carrier wave, passes through a coupling capacitor 36 and appears across an RF choke 37 at the input of a detector diode 38 which can be any one of a number of suitable types, preferably a semiconductor silicon or germanium diode. A resistor 42 and capacitor 43 are connected in parallel between the cathode of diode 38 and the common line 24 to form a conventional amplitude modulated detector circuit.

In accordance with the operation of the diode detector circuit, the radio frequency carrier wave after rectification by diode 38 charges capacitor 43 through resistor 42. Capacitor 43 discharges through the resistor when the diode is non-conducting. The time constant of the resistor and capacitor (RC) is selected to prevent the capacitor from completely discharging between cycles of the carrier wave. Therefore, the voltage across the capacitor is proportional to the amplitude of the carrier wave modulation so that the AM intelligence is recovered from the carrier wave. Such operation is conventional and is described, for example, in Terman, Radio Engineering, published by McGraw Hill.

The output of the detector across the RC time constant circuit is applied through a low pass filter 44 to a further utilization device such as a loud speaker or a pair of earphones, preferably through subsequent amplifier stages (not shown).

When a signal of a type other than an amplitude modulated carrier wave is applied at terminal 10, one of a plurality of local oscillators 50–1, 50–2 or 50–3 is switched into operation in the detector circuit. For example, consider that a double side band, suppressed carrier signal is applied through amplifier 12 and isolation pad 14 to the base of transistor amplifier 20. Such a signal could not, by itself, be demodulated by the circuit of FIG. 1 without the proper carrier wave being reinserted. This is accomplished by closing a ganged two section switch 51–1 which applies B+ from an output terminal 54 of a source (not shown) through section **51–1*a* to a local oscillator 50–1 to place it into operation. Local oscillator 50–1** is a stable local oscillator, which can be crystal controlled, and its output frequency is the same as the frequency of the original suppressed carrier of the received signal.

Another section **51–1*b* of the switch connects the output of the local oscillator 50–1 onto a line leading to the input of a second isolation pad 56 of the same general construction as isolation pad 14. The signal from the local oscillator 50–1 is injected from pad 56 into the base input of transistor amplifier 20 where it is mixed with the double side band suppressed carrier signal to produce a double side band amplitude modulated carrier wave which appears across tank circuit 30. This amplitude modulated carrier wave is applied to the detector diode 38** which strips the intelligence from the AM signal in the manner described above.

The intelligence modulated onto signals other than conventional AM modulated or suppressed carrier double side band signals can also be detected by the circuit of FIG. 1 in the same manner as that described above. It is only necessary to provide a local oscillator 50 which produces a signal of the correct frequency for mixing with the received signal to form a composite signal capable of being detected by the detector components 38, 42 and 43.

For example, a local oscillator 50–2 is switched into operation by a switch 51–2 to provide the local oscillation injection signal for a single side band suppressed carrier signal. Again, an amplitude modulated signal is produced at the output of mixer-amplfier 20 which is detected by diode 38. For frequency shift keying (FSK) signals local oscillator 51–3 is energized to produce a signal which beats with the FSK signal to produce an audio frequency output. For example an FSK signal with a center frequency of 1 mc. which is shifted between 999 kc. and 1001 kc. to produce mark and space information is heterodyned (beat) with a signal of 998 kc. from a local oscillator 50–3. The resultant beat frequencies of 1 kc. and 3 kc. are easily detected by the circuit 38, 42 and 43.

Other AM types of signals may be detected in a similar manner. For example, for receiving continuous wave (CW) or keyed (on-off) CW signals, a separate local oscillator 50 (not shown) is switched into the circuit to beat with the received signal to produce an audio tone which can be detected. It should be understood that as many oscillators 50 as desired can be provided in accordance with the variety of types of signals which are to be received and demodulated.

FIGURE 2 is another embodiment of the invention which provides better isolation in the circuit between detection of amplitude modulated carrier wave signals and detection of other types of signals. The operation of the circuit of FIGURE 2 is considered first with respect to an amplitude modulated carrier wave of the conventional double side band type. A battery 22 is provided having its positive terminal connected to a source of reference potential 60 and its negative terminal connected to the movable wiper arm of section **62*a* of a two section switch 62. In the position shown for switch 62 for reception of an amplitude modulated carrier wave, a negative voltage is applied through a radio frequency (RF) choke 64 to establish a bias at the base of an NPN transistor 70 through a voltage divider network formed by resistors 66 and 68, the upper end of the latter connected to the point of reference potential 60. The emitter of transistor 70 is biased from the battery 22 through the RF choke 64 and a voltage divider formed by resistors 71 and 72. Resistor 72 is unbypassed while resistor 71 is bypassed by a capacitor 73. This provides an amount of degenerative feedback for amplifier 70. A capacitor 74 is also connected between the upper end of RF choke 64 and the point of reference potential 60** to provide filtering for the battery voltage.

The collector of transistor 70 is returned to the point of reference potential through a choke 76 and diode 77 both of which are shunted by a capacitor 78. This arrangement provides temperature stabilization for transistor 70 in a manner similar to that previously described. A detector diode 90 and RC time constant circuit resistor 92 and capacitor 93 are also connected between the collector of transistor 70 and the point of reference potential.

With switch 62 in the position shown in FIG. 2, a second transistor 80 is held in a cut-off condition by applying the negative voltage at the upper end of RF choke 64 to the base of this transistor through a voltage divider formed by resistors 81 and 82, the latter of which has its lower end connected to the point of reference potential. At the same time the negative voltage is also applied by a second voltage divider formed by resistors 83 and 84 to the anode of a diode 85. This diode is connected to the output of a local oscillator 50–2 through a capacitor 86. When negative voltage is applied to the anode of diode 85 it is reverse biased and blocked from conducting any signal present at the input to capacitor 86 to the base of transistor 80. In this embodiment, oscillator 50–2 is left on at all times.

With transistor 80 cut off the circuit of FIG. 2 functions in the same manner as the AM circuit of FIG. 1. Amplitude modulated signals applied to the base of transistor amplifier 70 through amplifier 12 and capacitor 16 appear in amplified form at the collector. Here they are detected by the diode 90 and the RC time constant resistor 92 and a capacitor 93. The amplitude modulated intelligence is stripped off the AM carrier wave in the manner previously described and applied through an RF choke 95 and capacitor 96 to the output of the circuit for subsequent amplification and utilization.

To demodulate another type of intelligence, for example suppressed carrier single side band, switch 62 is thrown to the other (right) position. This disconnects the negative terminal of battery 22 from the RF choke 64 and connects it to another RF choke 100, which is bypassed by a filter capacitor 102 connected from the upper end of the choke to the point of reference potential 60. The negative voltage from choke 100 provides a forward (negative) bias to the emitter of transistor 80 through a resistor 104 which is bypassed to ground by a capacitor 106. The negative voltage at the upper end of resistor 104 is also applied through a diode 108 to bias the base of transistor 80 through the voltage divider formed by resistor 71, 81 and 82.

Negative voltage from diode 108 is also used to bias the emitter of transistor amplifier 70 through the voltage divider formed by resistors 71 and 72. The base of transistor amplifier 70 is also biased through diode 108 and the voltage divider formed by resistors 71, 66 and 68. In this manner both transistors 70 and 80 are able to conduct with switch 62 in the "right" position.

Moving switch 62 to the right removes the reverse blocking bias for the anode of diode 85 from voltage divider 83 and 84 and a forward (negative) bias is aplied to the cathode of this diode through a resistor 112. This permits diode 85 to pass the signal from the local oscillator 50–2 to the base of transistor 80 through a capacitor 114 and resistor 116.

The amplified version of the signal from local oscillator 50–2 appears at the collector of transistor 80 as does the amplified version of the received suppressed carrier single side band signal amplified by transistor 70. These two amplified signals are mixed together at the cathode of the detector diode 90 to produce a composite amplitude modulated wave. The intelligence is stripped from this amplitude modulated wave by the detector circuit formed by the diode 90 and the RC circuit resistor 92 and capacitor 93 and applied to the output of the circuit through RF choke 95 and capacitor 96.

It should be obvious that the circuit of FIG. 2 can demodulate other types of intelligence by providing additional oscillators. In this case the additional oscillators would be left on at all times and an individual oscillator selectively connected by means of a switch 51 to the input of capacitor 86 after switch 62 is thrown to the right.

While preferred embodiments of the invention have been described above, it will be understood that these are illustrative only, and the invention is limited solely by the appended claims.

What is claimed is:

1. A multipurpose receiver which receives a plurality of types of signals modulated with intelligence comprising:
- first and second amplifier means each having respective input and output electrodes,
- means connected to the output electrodes of said first and second amplifier means for detecting intelligence from a carrier wave signal applied to the input electrode of said first amplifier means,
- means for producing a local oscillator signal,
- means including a diode for applying the local oscillator signal to the input electrode of said second amplifier means to mix at the output electrode thereof with a signal applied to the input electrode of said first amplifier means to produce a signal whose intelligence is to be demodulated by said detecting means,
- and means for selectively rendering both said diode and said second amplifier means non-conductive to thereby block the local oscillator signal from the input and output of said second amplifier means in a first mode of operation of the receiver and for rendering both said diode and said second amplifier means conductive to pass the local oscillator signal to said detecting means in a second mode of operation.

2. A multipurpose receiver as set forth in claim 1 wherein said local oscillator signal producing means is operative to produce said local oscillator signal at all times that the receiver is operative.

3. A multipurpose receiver which receives a plurality of types of signals modulated with intelligence comprising:
- first and second amplifier means each having respective input and output electrodes,
- means for applying the received signals to the input electrode of said first amplifier means,
- means connected to the output electrodes of said first and second amplifier means for detecting intelligence from a carrier wave signal applied to the input electrode of said first amplifier means,
- means for producing a local oscillator signal,
- means including a diode connected in series between the output of the oscillator and the input electrode of said second amplifier means for applying the local oscillator signal to the input electrode of said second amplifier means to mix at the output electrode thereof with a signal applied to the input electrode of said first amplifier means to produce a signal whose intelligence is to be demodulated by said detecting means,
- means connected to said first and second amplifier means and to said diode for supplying a bias voltage thereto,
- and means connected to said bias voltage supply means for selectively applying the bias voltage to both said diode and said second amplifier means to render them non-conductive to thereby block the local oscillator signal from the input and output of said second amplifier means in a first mode of operation of the receiver and for rendering both said diode means and said second amplifier means conductive to pass the local oscillator signal to said detecting means in a second mode of operation.

4. A multipurpose receive as set forth in claim 3 wherein said local oscillator signal producing means is operative to produce said local oscillator signal at all times that the receiver is operative.

5. A multipurpose receiver as in claim 3 wherein said bias voltage supply means comprises at least a portion of the receiver power supply, said means for selectively applying the bias voltage further comprising a switch, first means connected to said switch in a first operating position for applying voltage from one terminal of said supply means to operate said first amplifier means and render said diode and said second amplifier means nonconductive to thereby place the receiver in said first mode of operation, and second means connected to said switch for applying voltage from said one terminal of said supply means to operate said first amplifier means and to render both said diode and said second amplifier means conductive to thereby place the receiver in said second mode of operation.

References Cited

UNITED STATES PATENTS

| | | | |
|---|---|---|---|
| 2,811,638 | 10/1957 | Regnier | 325—316 |
| 3,172,040 | 3/1965 | Schultz | 325—316 |
| 3,182,261 | 5/1965 | Broadhead et al. | 325—315 |
| 3,345,571 | 10/1967 | Selwyn | 325—317 XR |

KATHLEEN H. CLAFFY, Primary Examiner

R. S. BELL, Assistant Examiner

U.S. Cl. X.R.

325—439